United States Patent
Nowak

(10) Patent No.: US 11,880,819 B2
(45) Date of Patent: Jan. 23, 2024

(54) CONTACTLESS FUEL PAYMENT SYSTEMS AND METHODS

(71) Applicant: Capital One Services, LLC, McLean, VA (US)

(72) Inventor: Matthew Nowak, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/513,958

(22) Filed: Oct. 29, 2021

(65) Prior Publication Data

US 2023/0137137 A1    May 4, 2023

(51) Int. Cl.
| | |
|---|---|
| *G06Q 20/02* | (2012.01) |
| *G06Q 20/32* | (2012.01) |
| *G06Q 20/20* | (2012.01) |
| *G06K 7/10* | (2006.01) |

(52) U.S. Cl.
CPC ....... *G06Q 20/208* (2013.01); *G06K 7/10297* (2013.01); *G06Q 20/3278* (2013.01)

(58) Field of Classification Search
CPC ............. G06Q 20/208; G06Q 20/3278; G06K 7/10297
See application file for complete search history.

(56) References Cited

U.S. PATENT DOCUMENTS

| | | | |
|---|---|---|---|
| 10,949,830 B1 * | 3/2021 | Gaudin | G06Q 20/3226 |
| 2007/0040030 A1 * | 2/2007 | Kranzley | G06K 19/07327 235/382 |
| 2014/0279546 A1 * | 9/2014 | Poole | G06Q 30/06 705/44 |
| 2015/0161590 A1 | 6/2015 | Genovez | |

OTHER PUBLICATIONS

T. Halevi, D. Ma, N. Saxena, and T. Xiang, "Secure Proximity Detection for NFC Devices Based on Ambient Sensor Data," Proc. European Symp. Research in Computer Security (ESORICS), Sep. 2012. (Year: 2012).*

* cited by examiner

*Primary Examiner* — Allen C Chein
*Assistant Examiner* — Aaron N Tutor
(74) *Attorney, Agent, or Firm* — TROUTMAN PEPPER HAMILTON SANDERS LLP; Christopher J. Forstner; John A. Morrissett

(57) ABSTRACT

A system may receive, via an NFC tag disposed proximate a vehicle fuel tank, a fuel transaction request from a third-party POS NFC reader positioned proximate a fuel pump. The system may detect a user device being paired with a vehicle communication device of the vehicle to enable a short-range wireless communication. The system may determine that the user device is associated with an authorized user of the vehicle. The system may unlock the NFC tag to enable the NFC tag to communicate with the third-party POS NFC reader for a predefined time limit responsive to determining that the user device is associated with the authorized user. Responsive to unlocking the NFC tag, the system may retrieve account payment information associated with the authorized user, and may transmit, via the NFC tag, the account payment information to the third-party POS NFC reader to complete the fuel transaction.

20 Claims, 7 Drawing Sheets

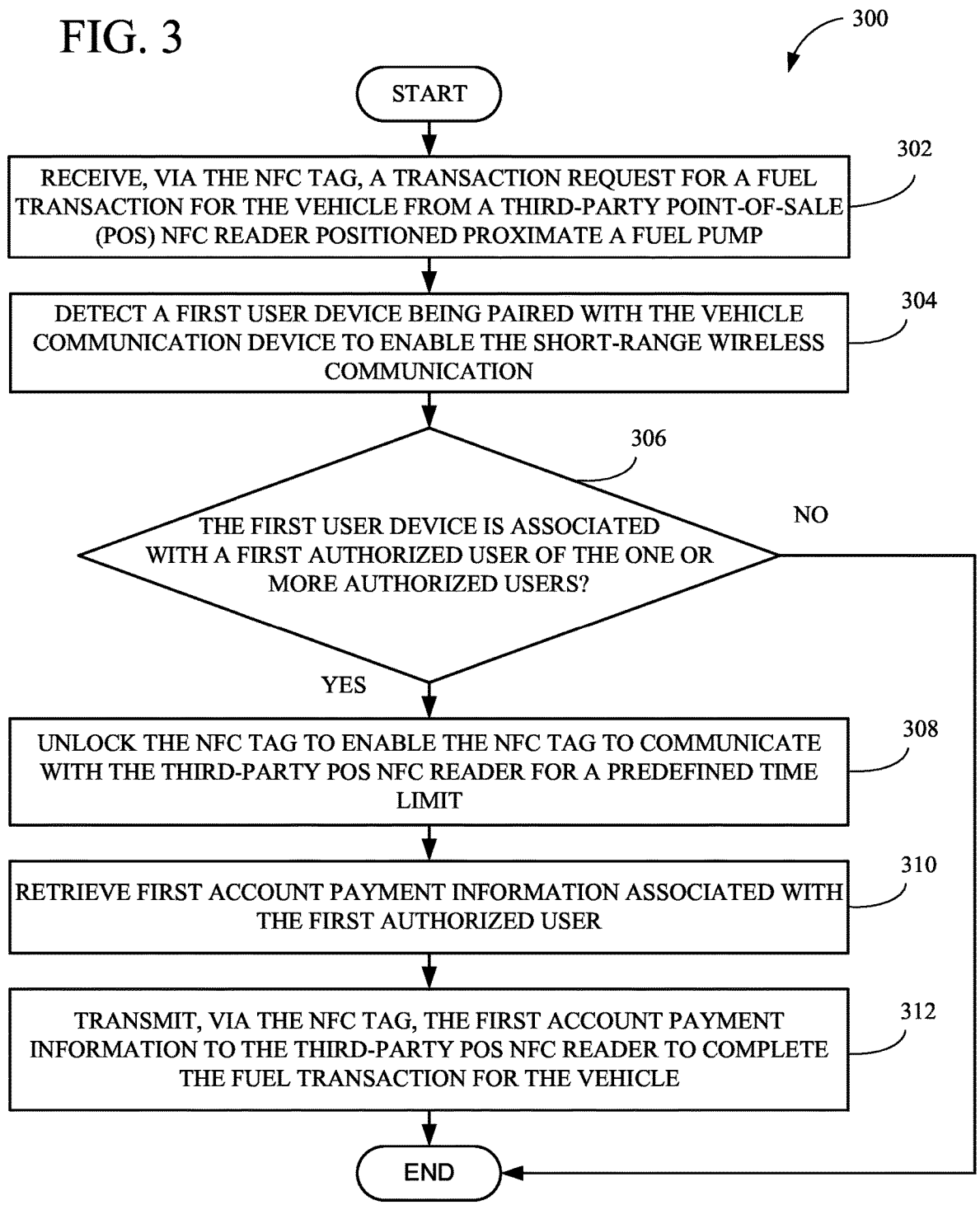

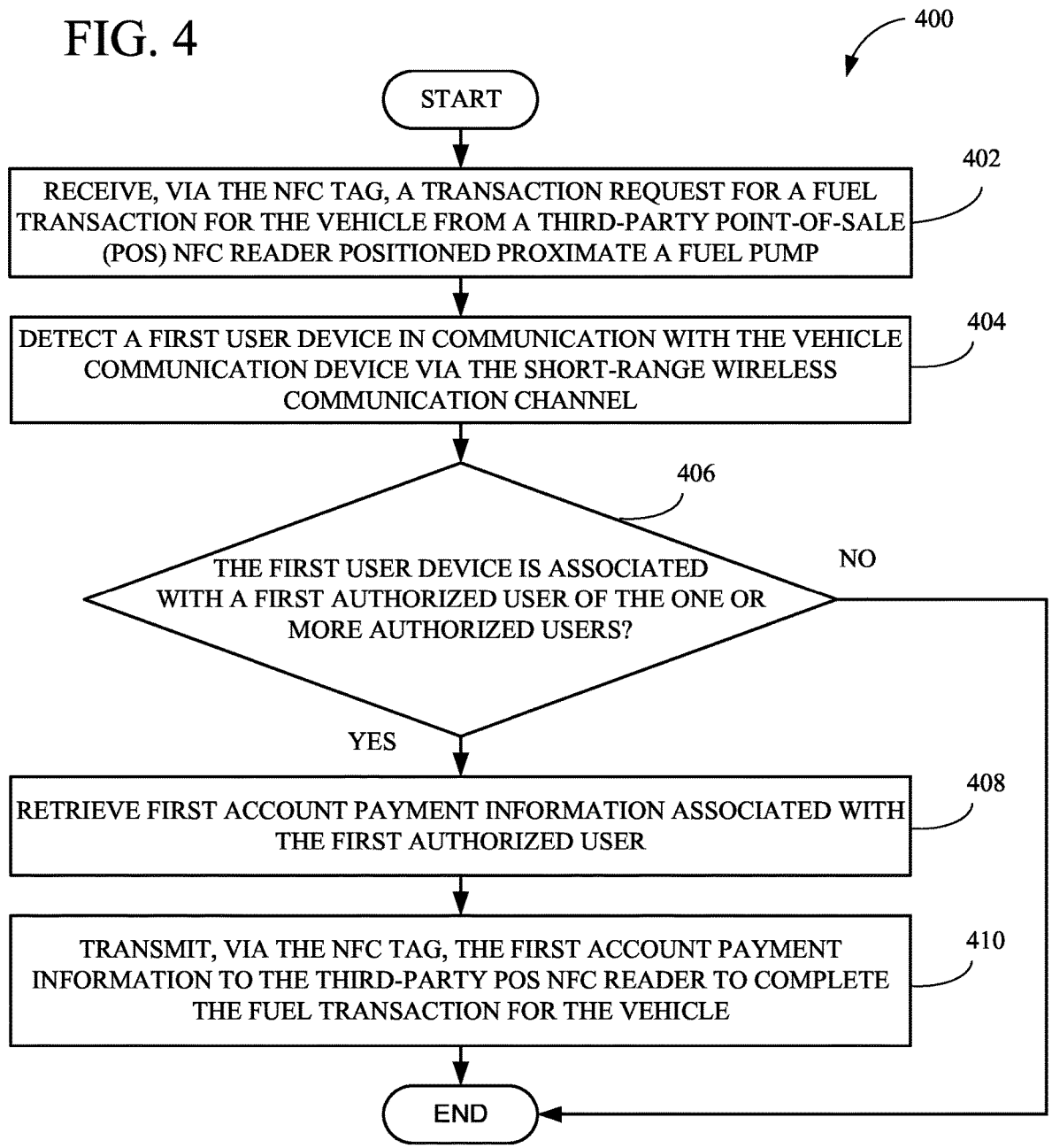

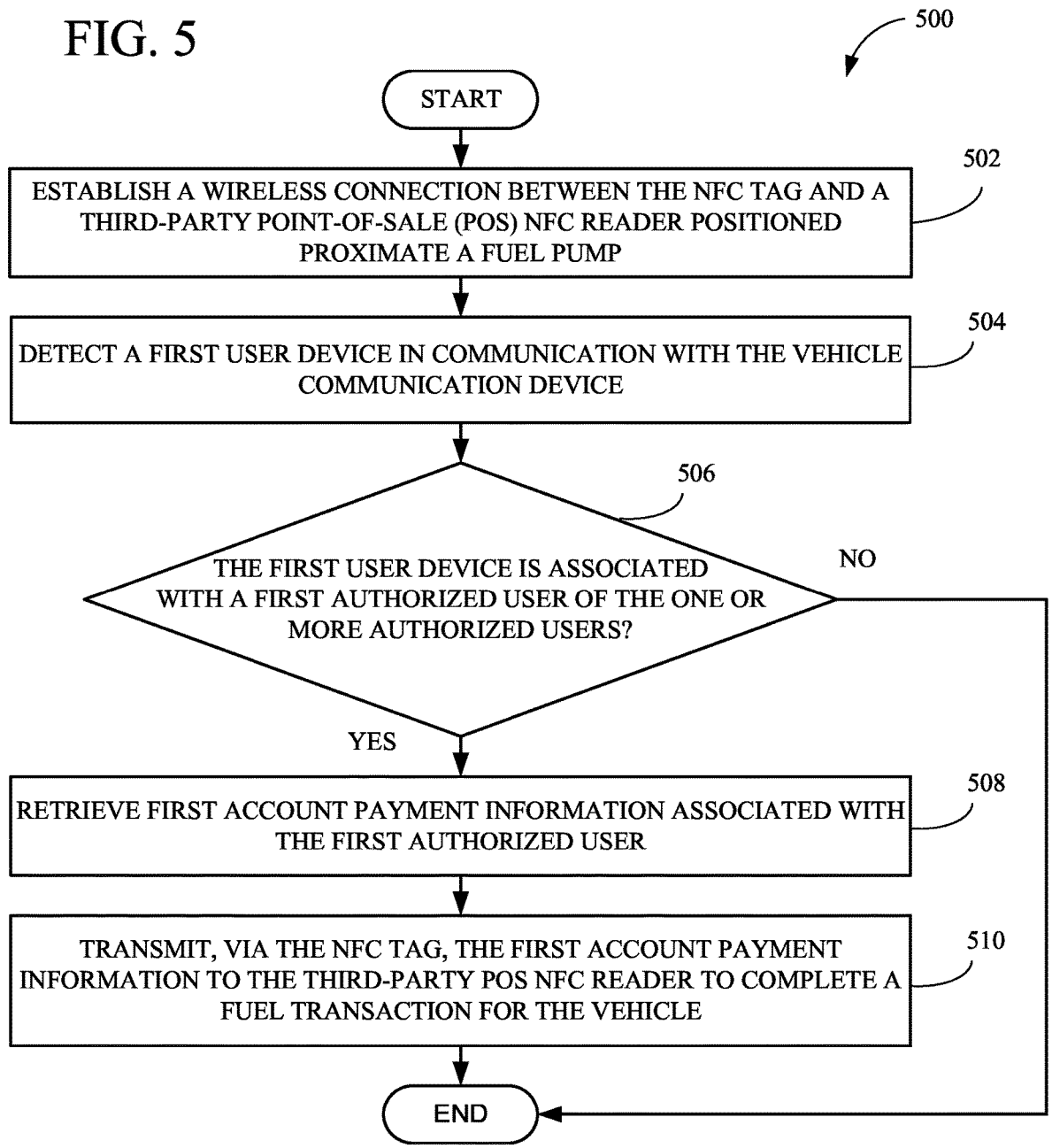

CONTACTLESS FUEL PAYMENT SYSTEMS AND METHODS

FIELD

The disclosed technology relates to systems and methods for conducting contactless fuel payment, and more particularly contactless fuel payment systems that use payment accounts associated with authorized user(s) of a vehicle.

BACKGROUND

Existing systems for conducting fuel station transactions typically require manual customer interactions, such as prepaying for fuel at a cashier by way of debit/credit or cash, or at a self-service point-of-sale (POS) terminal by way of debit/credit. An advantage of the self-service systems over the cashier-based system is that the customer need not walk to the cashier, wait in line to pay for the transaction, and walk back to his vehicle. However, existing self-service systems can create delays and inefficiencies for customers by still requiring manual customer interactions (e.g., inserting a debit or credit card, entering a personal identification number (PIN) and/or zip code, etc.).

To expedite the fuel transaction process, some systems allow customers to use contactless payment cards that are equipped with a wireless communications interface such as a Near Field Communication (NFC) interface to enable the payment card to electronically communicate with the merchant's POS terminal to perform the transaction in lieu of physically inserting the card into the POS terminal. NFC is a set of standards to establish radio communication between devices by bringing them into close proximity, such as only a few centimeters, and thus the customer is still required to manually position the contactless card within range of the NFC reader on the POS terminal and perform additional security measures such as entering a PIN. Contactless payment systems can also create opportunity for transaction fraud if a nearby fraudster's device can communicate with or has access to a customer's contactless card or other NFC device.

Accordingly, there is a need for improved systems and methods for utilizing contactless payment systems for fuel transactions. The disclosed systems and methods are directed to this and other considerations.

SUMMARY

Disclosed embodiments may include contactless fuel payment systems.

One exemplary system may include a near field communication (NFC) tag disposed at a fixed position proximate a fuel tank of a vehicle associated with one or more authorized users. The system may include a vehicle communication device associated with the vehicle and configured to selectively pair with one or more devices (e.g., the authorized user's smartphone) positioned within a predefined distance of the vehicle communication device to enable short-range wireless communication. The system may include one or more processors and may include memory in communication with the one or more processors and storing instructions that, when executed by the one or more processors, are configured to cause the system to perform a method for conducting contactless fuel payment. When an authorized user attempts to conduct a transaction to fuel the vehicle, he may position the fuel nozzle proximate the merchant's POS terminal in or near the fuel tank of the vehicle. In turn, the system may receive, via the NFC tag, a transaction request for the fuel transaction from a third-party POS NFC reader positioned proximate a fuel pump. To confirm that the fuel transaction is being attempted by an authorized user rather than a fraudster, the system may detect a first user device (e.g., the authorized user's device) being paired with the vehicle communication device to enable the short-range wireless communication (e.g., Bluetooth™). The system may determine that the first user device is associated with a first authorized user of the one or more authorized users. In response to determining that the first user device is associated with the first authorized user, the system may unlock the NFC tag to enable the NFC tag to communicate with the third-party POS NFC reader for a predefined time limit. The NFC tag may be configured to lock as a default before being unlocked and after the predefined time limit expires. Responsive to unlocking the NFC tag, the system may retrieve first account payment information associated with the first authorized user, and may transmit, via the NFC tag, the first account payment information to the third-party POS NFC reader to complete the fuel transaction for the vehicle.

Another exemplary system may establish a wireless connection between the NFC tag and the third-party POS NFC reader, and proceed with detecting a first user device being paired with the vehicle communication device and determining that the first user device is associated with a first authorized user even before (or at least simultaneously with) receiving the transaction request.

Yet another exemplary system may not include the locking/unlocking of the NFC tag, and as such, may retrieve the first account payment information and transmit that payment information to the third-party POS NFC reader in response to determining that the first user device is associated with the authorized user.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology.

FIG. 3 is a flow diagram illustrating an exemplary method for conducting contactless fuel payment, in accordance with certain embodiments of the disclosed technology.

FIG. 4 is a flow diagram illustrating an exemplary method for conducting contactless fuel payment, in accordance with certain embodiments of the disclosed technology.

FIG. 5 is a flow diagram illustrating an exemplary method for conducting contactless fuel payment, in accordance with certain embodiments of the disclosed technology.

DETAILED DESCRIPTION

Certain implementations of the disclosed technology may be utilized to enable contactless payment for fuel transactions. Typical fuel station transactions require manual interactions, which oftentimes create unnecessary delays or inefficiencies for customers, and can also provide opportunity for transaction card fraud. Embodiments of the disclosed technology may be utilized to eliminate the need for manual payments during fuel transactions.

In certain implementations, a vehicle may be configured to recognize one or more authorized users by pairing a vehicle communication device associated with the vehicle, to one or more devices associated with the one or more authorized users. The vehicle may also be configured with an NFC tag disposed proximate the vehicle's fuel tank such that the vehicle may wirelessly receive a transaction request, via the NFC tag, from a third-party POS NFC reader positioned proximate a fuel pump. The vehicle may be configured to retrieve account payment information associated with a first authorized user of the one or more authorized users based on detecting a first user device associated with that first authorized user, the first user device being within a predefined distance of the vehicle communication device. Such implementations may be utilized to reduce and/or eliminate the need for manual interactions when conducting fuel payment transactions. Additionally, some implementations may also take fraud mitigation action(s) to prevent unauthorized access to users' account payment information.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
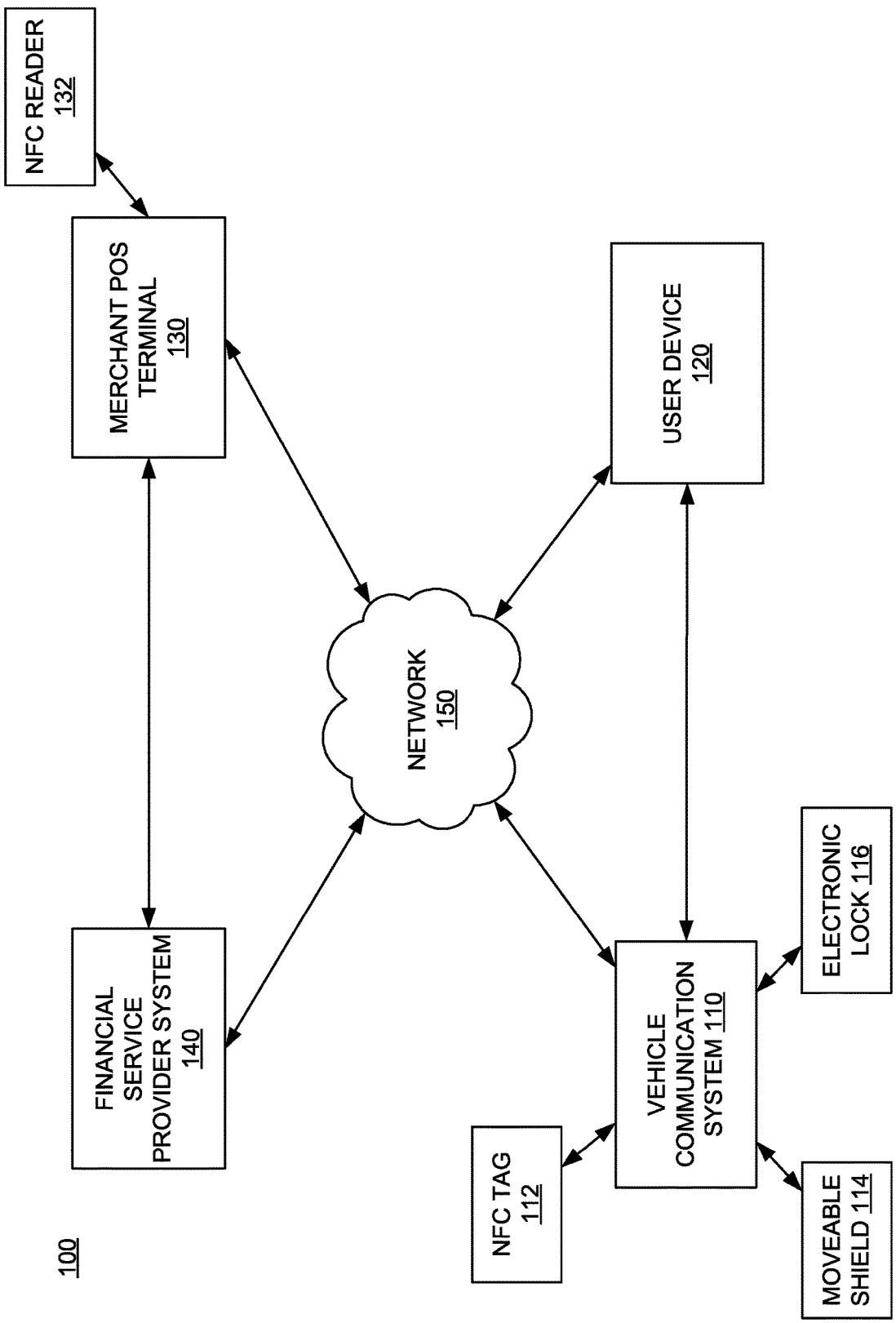
FIG. 1 is a block diagram of an example system that may be used to conduct contactless fuel payment, according to an example implementation of the disclosed technology.

FIG. 1 is a diagram of an example system 100 that may be configured to perform one or more processes for conducting contactless fuel payment. The components and arrangements shown in FIG. 1 are not intended to limit the disclosed embodiments as the components used to implement the disclosed processes and features may vary. As shown, system 100 may include a vehicle communication system 110, which may be connected to a user device 120, a merchant POS terminal 130, and/or a financial service provider system 140 via a network 150.

Vehicle communication system 110, as further described below with respect to FIG. 2, may be associated with a vehicle and configured to selectively pair, via a vehicle communication device, with one or more devices positioned within a predefined distance of the vehicle communication device to enable short-range wireless communication (e.g., Bluetooth™). Vehicle communication system 110 may include or be configured to communicate with the vehicle's internal computer, an NFC tag 112 disposed proximate the vehicle's fuel tank, and a moveable shield 114 and/or an electronic lock 116 configured to lock NFC tag 112 when not being used for conducting a fuel transaction, as further illustrated in FIGS. 6A-6B. Vehicle communication system 110 may be configured to accept and/or retrieve account information associated with one or more authorized users of the vehicle, and to transmit the account information to merchant POS terminal 130 via NFC tag 112.

User device 120 may include one or more of a mobile device, smart phone, tablet computer, laptop computer, smart wearable device, voice command device, other mobile computing device, or any other device capable of communicating with network 150 and/or vehicle communication system 110. Users of user device 120 may include individuals such as, for example, subscribers, clients, prospective clients, or customers of an entity associated with financial service provider system 140. According to some embodiments, user device 120 may include one or more of: an environmental sensor for obtaining audio or visual data (e.g., a microphone and/or digital camera), a geographic location sensor for determining the location of the device, an input/output (I/O) device such as a transceiver for sending and receiving data (e.g., via WiFi™, cellular communications, NFC, Bluetooth™, and the like), a display for displaying digital images, one or more processors, and a memory in communication with the one or more processors.

Merchant POS terminal 130 may be associated with an entity such as a business, corporation, individual, partnership, or any other entity that may be a seller of goods and/or services such as a convenience store, a fuel station, or the like. Merchant POS terminal 130 may include an NFC reader 132 disposed proximate a fuel dispenser nozzle for a fuel pump such that NFC reader 132 may wirelessly communicate with vehicle communication system 110 via NFC tag 112, as further illustrated in FIGS. 6A-6B. Merchant POS terminal 130 may also communicate with financial service provider 140 via network 150, for example, to receive authorization for completing fuel transactions.

Financial service provider system 140 may be associated with an entity such as a business, corporation, individual, partnership, or any entity that may provide financial services or processing of financial transactions such as a bank, a credit card company, or the like. In some embodiments, financial service provider system 140 may store and/or have access to detailed customer information, such as account numbers, transaction information, etc., associated with a customer.

In some embodiments, financial service provider system 140 may include a customer information database relating to customer profiles, vehicles, and customer accounts, such as for example, customer identification information (e.g., name, age, sex, birthday, address, customer status, preferences, preferred language, vehicle(s) owned, greeting name, preferred communication channel, bank accounts, mortgage loan accounts, credit card accounts, car loan accounts, residence, fuel purchase amount and location history, account numbers, authorized users associated with one or more accounts, account balances, account payment history, etc.) and other such account-related information. The customer information database may further include stored data relating to previous interactions between an organization (or its related entity) and a customer. The customer information database may also include information about business transactions between an organization (and/or its related entity) and a customer that may be obtained from, for example, a transaction server. The customer information database may also include customer feedback data such as approval to enroll in a fuel spend limit program, indications of whether an automated interaction with a customer was successful, online surveys filled out by a customer, surveys answered by a customer following previous interactions to the account provider, digital feedback provided through websites or mobile application associated with the organization or its related entity, reviews written by a customer, complaint forms filled out by a customer, information obtained from verbal interactions with customer (e.g., information derived from a transcript of a customer service call with a customer that is generated using, for example, voice recognition techniques) or any other types of communications from a customer to the organization or its related entity. According to some embodiments, the functions provided by the customer information database may also be provided by a database that is external to financial service provider system 140.

Network 150 may be of any suitable type, including individual connections via the Internet such as cellular or WiFi™ networks. In some implementations, the network 150 may enable the communication(s) between the various systems, terminals, vehicle systems, and devices as depicted in FIG. 1. In some embodiments, network 150 may connect with the user device 120 using available channels, including but not limited to: radio-frequency identification (RFID), NFC, Bluetooth™, low-energy Bluetooth™ (BLE), WiFi™, ZigBee™, ambient backscatter communications (ABC) protocols, USB, Ethernet, or LAN. In some embodiments, data may be transmitted across network 150 in either an encrypted or un-encrypted format. Network 150 may comprise a mobile network interface that provides access to a cellular network, the Internet, or another wide-area network. In some embodiments, a mobile network interface may include hardware, firmware, and/or software that allows one or more processors to communicate with other devices via wired or wireless networks, whether local or wide area, private or public, as known in the art. A power source may be configured to provide an appropriate alternating current (AC) or direct current (DC) to power components of network 150.

As described above, one or more of the components depicted in system 100 may be configured to remotely communicate with one another and may include one or more of a microprocessor, microcontroller, digital signal processor, co-processor, memory, or the like or combinations thereof capable of executing stored instructions and operating upon stored data. Memory may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory.

System 100 may include one or more storage devices configured to store information used by one or more processors (or other components) to perform certain functions related to the disclosed embodiments. In one example, the system 100 may include memory storing instructions to enable one or more processors to execute one or more applications, such as server applications, network communication processes, and any other type of application or software known to be available on computer systems. Alternatively, the instructions, application programs, etc., may be stored in an external storage or available from a memory over network 150. The one or more storage devices may be a volatile or non-volatile, magnetic, semiconductor, tape, optical, removable, non-removable, or other type of storage device or tangible computer-readable medium.

In some embodiments, system 100 may include memory that includes instructions that, when executed by one or more processors, perform one or more processes consistent with the functionalities disclosed herein. Methods, systems, and articles of manufacture consistent with disclosed embodiments are not limited to separate programs or computers configured to perform dedicated tasks.

System 100 may also be communicatively connected to one or more memory devices (e.g., databases (not shown)) locally or through network 150. The remote memory devices may be configured to store information and may be accessed and/or managed by, e.g., financial service provider system 140. By way of example, the remote memory devices may be document management systems, Microsoft® SQL databases, SharePoint® databases, Oracle® databases, Sybase™ databases, Postgres, MariaDB®, Couchbase™, Redis™, MongoDB® or other relational or non-relational databases. Systems and methods consistent with disclosed embodiments, however, are not limited to separate databases or even to the use of a database.

In exemplary embodiments of the disclosed technology, system 100 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

In some embodiments, one or more web applications may be utilized by system 100, for example, to interface with user device 120. In certain implementations, the one or more web applications may include one or more web components. A rendered web component, for example, may be at least partially insulated from styles or variables that are defined outside of the web component, and easily copied and embedded in a wide variety of different types of code and applications, while preserving its general functionality. Web components may be programmed in a client-side programming language such as Javascript, although this is not a requirement. Any suitable client-side programming language or software language can also be used.

Figure 2:
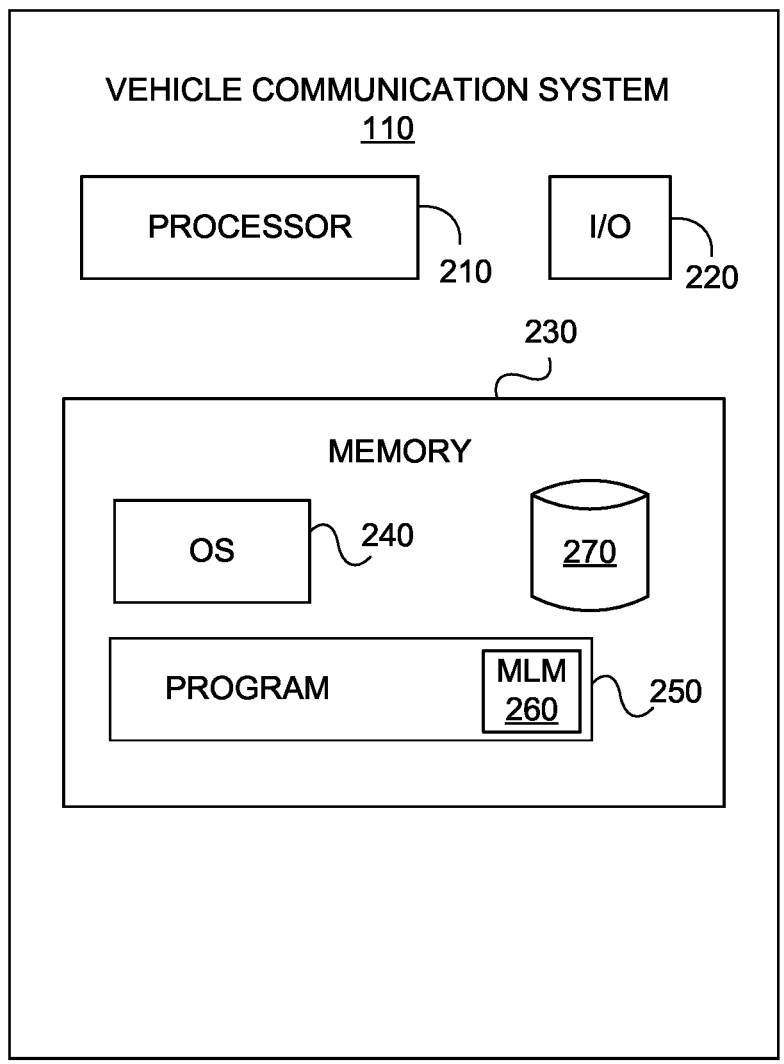
FIG. 2 is a component diagram of an example vehicle communication system, in accordance with certain embodiments of the disclosed technology.

An example embodiment of vehicle communication system 110 is shown in more detail in FIG. 2. Vehicle communication system 110 may have a similar structure and functions as depicted and described above with respect to FIG. 1. As shown, vehicle communication system 110 may include a processor 210; an I/O device 220; a memory 230, which may contain an operating system (OS) 240, a program 250, and a storage device 270, which may be any suitable repository of data. In some embodiments, program 250 may include an MLM 260 that may be trained, for example, to receive user information (e.g., account information, device information, etc.), and compare the received user information to stored or previously associated user information to identify a current user. In certain implementations, MLM 260 may issue commands in response to processing an event, in accordance with a model that may be continuously or intermittently updated. Moreover, processor 210 may execute one or more programs (such as via a rules-based platform or the trained MLM 260), that, when executed, perform functions related to disclosed embodiments.

In some embodiments, as described above, vehicle communication system 110 may include a vehicle communication device (e.g., within the vehicle's internal computer) configured to wirelessly pair (e.g., via Bluetooth™) with one or more devices associated with one or more authorized users of the vehicle. Vehicle communication system 110 may be configured to receive payment account information associated with one or more authorized users, for example, via one or more user devices associated with the one or more authorized users, or via financial service provider system 140. Vehicle communication system 110 may be configured to store the received payment account information. Vehicle communication system 110 may also be configured to transmit payment account information associated with one or more authorized users to merchant POS terminal 130 via NFC tag 112.

In some embodiments, vehicle communication system 110 may include an NFC tag 112 disposed proximate the vehicle's fuel tank. The NFC tag 112 (e.g., operated via IEC 14443) may act as a payment mechanism upon receiving a transaction request from a third-party POS NFC reader 132, as described above, by storing and/or receiving payment account information.

In some embodiments, vehicle communication system 110 may include a moveable shield 114 configured to physically cover NFC tag 112 when not being used for conducting a fuel transaction. In some embodiments, moveable shield 114 may comprise a lock (e.g., mechanical, magnetic, etc.) to hold moveable shield 114 closed so as to keep NFC tag 112 physically covered when NFC tag 112 is not in use, or when a user does not wish to use NFC tag 112 for transmitting payment during a fuel transaction. In some embodiments, the lock may be configured to engage and disengage at the same time as an outer gas tank cover which may be opened from inside the vehicle and/or by using a remote key fob. In some embodiments, the lock may comprise a lever or pole configured to slide (e.g., upward, downward, forward) in front of moveable shield 114 such that moveable shield 114 may not be opened (e.g., slid left or right).

Upon a fuel nozzle being inserted into the vehicle fuel tank, moveable shield 114 may be configured to slide or otherwise move away from NFC tag 112 such that a wireless connection may be established between NFC tag 112 and POS NFC reader 132 for purposes of conducting a fuel transaction. In some embodiments, moveable shield 114 may be configured such that NFC tag 112 is not viewable from outside a vehicle when moveable shield 114 is in a first position, while NFC tag 112 is viewable from outside the vehicle when moveable shield 114 is in a second position. For example, moveable shield 114 may be connected to the vehicle via a spring such that a user of the vehicle may push or pull moveable shield 114 back to expose NFC tag 112 such that the fuel nozzle may be inserted into the vehicle fuel tank and a wireless connection established between NFC tag 112 and the POS NFC reader 132, as depicted in FIG. 6B. In another example, moveable shield 114 may be connected to the vehicle via a spring such that the insertion of the fuel nozzle into the fuel tank itself (e.g., based on a unique shape of the fuel nozzle) moves the shield out of the way of NFC tag 112 such that a wireless connection may be established between NFC tag 112 and POS NFC reader 132. A moveable shield provides an added benefit of preventing any unwanted or unnecessary physical contact of the NFC tag, interference from other unauthorized NFC connections, and damage to the NFC tag.

In some embodiments, vehicle communication system 110 may include an electronic lock 116 configured to keep NFC tag 112 digitally covered when NFC tag 112 is not in use. An electronic lock provides an additional layer of security by preventing the NFC tag 112 from being read by intercepting NFC signals.

In some embodiments, moveable shield 114 and/or electronic lock 116 may be configured to remain in a locked position as a default setting before being unlocked and after a predefined time limit expires. For example, after a fuel nozzle is removed from the vehicle's fuel tank, moveable shield 114 and/or electronic lock 116 may automatically revert to a locked position after 30 seconds, 1 minute, 3 minutes, 5 minutes, etc. have elapsed. This predetermined time limit may include a default setting within vehicle communication system 110 and may be customizable by one or more authorized users of the vehicle. In some embodiments, moveable shield 114 and/or electronic lock 116 may be configured to be controlled by the vehicle communication system 110 and/or one or more authorized users of the vehicle. For example, moveable shield 114 may be configured to be locked and unlocked automatically by vehicle communication system 110 and/or manually by a user (e.g., with a form of key or by simply maneuvering moveable shield 114, as discussed above). Electronic lock 116 may also be configured to be locked and unlocked automatically by vehicle communication system 110 and/or manually by a user (e.g., by selecting a setting via a graphical user interface (GUI) of a mobile application on a user device or a digital display screen disposed inside the vehicle).

Vehicle communication system 110 may be a single server or may be configured as a distributed computer system including multiple servers or computers that interoperate to perform one or more of the processes and functionalities associated with the disclosed embodiments. In some embodiments, vehicle communication system 110 may further include a peripheral interface, a transceiver, a mobile network interface in communication with processor 210, a bus configured to facilitate communication between the various components of vehicle communication system 110, and a power source configured to power one or more components of vehicle communication system 110.

Processor 210 may be one or more known processing devices, such as a microprocessor from the Pentium' family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

Vehicle communication system 110 may include or be in communication with one or more peripheral interfaces and may include the hardware, firmware and/or software that enables communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose I/O (GPIO) port, a game port, a universal serial bus (USB), a micro-USB port, a high-definition multimedia (HDMI) port, a video port, an audio port, a Bluetooth™ port, an NFC port, another like communication interface, or any combination thereof.

Vehicle communication system 110 may include memory 230 that may store one or more programs 250 to perform one or more functions of the disclosed embodiments. In some embodiments, vehicle communication system 110 may include MLM 260 that may be trained, for example, to recognize user behavior patterns (and deviations from typical patterns) based on past and/or pending credit card purchases, purchase location data, and/or other available information. In certain implementations, MLM 260 may issue commands in response to processing an event, in accordance with a model that may be continuously or intermittently updated. Moreover, processor 210 may execute one or more programs (such as via a rules-based platform or the trained MLM 260), that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 270 for storing user information (e.g., account information, device information, etc.) to perform one or more of the processes and functionalities associated with the disclosed embodiments.

While vehicle communication system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc.

FIG. 3 is a flow diagram of a method 300 for conducting contactless fuel payment. Method 300 may be performed by one or more components of system 100. The system may include an NFC tag disposed at a fixed position proximate a fuel tank of a vehicle associated with one or more authorized users; a vehicle communication device associated with the vehicle and configured to selectively pair with one or more devices positioned within a predefined distance of the vehicle communication device to enable short-range wireless communication; one or more processors; and memory in communication with the one or more processors and storing instructions that, when executed by the one or more processors, are configured to cause the system to perform certain functions.

In block 302, the system (e.g., via vehicle communication system 110) may receive, via the NFC tag (e.g., NFC tag 112), a transaction request for a fuel transaction for the vehicle from a third-party POS NFC reader (e.g., NFC reader 132) positioned proximate a fuel pump. That is, a user may drive his or her vehicle up to a fuel pump and initiate a fuel transaction by inserting the fuel pump nozzle into the vehicle's fuel tank. The NFC tag may be disposed at a fixed position proximate the fuel tank, for example, at the top (or "12 o'clock" position) of the fuel tank opening. The NFC tag may act as a form of transaction card for conducting the fuel transaction, as further described below, by storing and/or receiving payment account information. The NFC reader may be positioned at a fixed position on the fuel pump nozzle such that the NFC reader, connected to a merchant POS terminal at the fuel station, may transmit a request to conduct the fuel transaction. The transmitting of this fuel transaction request may occur when a wireless connection is established between the NFC reader and the NFC tag, as further described below.

In block 304, the system (e.g., via vehicle communication system 110) may detect a first user device (e.g., user device 120) being paired (e.g., via Bluetooth™) with the vehicle communication device (e.g., an internal processor of the vehicle). That is, one or more authorized users of the vehicle (e.g., an owner, an owner's family member, etc.) may have previously connected or stored one or more user devices associated with the one or more authorized users to the vehicle communication device. For example, an owner of the vehicle may have previously configured a user setting such that the vehicle would recognize the owner's mobile phone whenever the vehicle is running and the owner's mobile phone, with its Bluetooth™ setting turned on, comes within a predetermined distance of the vehicle, the predetermined distance being a distance required to establish a Bluetooth™ connection.

In some embodiments, in response to detecting the first user device being paired with the vehicle communication device via short-range communication, the system may be configured to determine, via a location tracking system (e.g., a Global Positioning System (GPS)) associated with the first user device, whether the first user device is within a predefined distance of the fuel pump. That is, the system may be configured to determine or receive a location of the first user device, and determine whether the location is within a preset distance, e.g., one mile, of a fuel station. In this way, the system may be configured to predict that the vehicle may be approaching a fuel station to conduct a fuel transaction. The system may then be configured to retrieve account payment information associated with the first authorized user responsive to determining the first user device is within the predefined distance of the fuel pump, as further described below. This feature provides the added benefit of increased efficiency in conducting fuel station transactions by the system being able to have a user's account information teed up for an upcoming fuel transaction. Additionally, this feature provides the benefit of reducing potentially fraudulent transactions in the event the system does not recognize a user device to be within the predefined distance of the fuel pump prior to retrieving account payment information.

In some embodiments, the system may identify a known fuel station transaction geographic region associated with the first user device, which may be based on prior fuel station transactions associated with the first user device and/or devices associated with similar users. Similar users, for example, may be identified algorithmically by factors such as similar location/geography, income, spend behaviors, occupation, demographic data, etc. To identify a known fuel station transaction geographic region, the system may train an MLM with historical fuel station transaction data associated with the first user device and/or devices associated with similar users and use the trained model to define a region that is commonly traveled by a user associated with the first user device as evidenced by where the user has historically purchased fuel. The historical fuel station transaction data may be based on prior card-present transaction data. Such transaction data may be utilized to determine where a user usually goes to purchase fuel in relation to a respective home address. In situations where a user has limited historical data for which to determine a fuel station transaction geographic region, (e.g., new customer, recently moved, etc.), the MLM may be trained using the available history for the user and history from similar users. In some examples, the system may define a fuel station transaction geographic region as being within 100 miles of the location of a past fuel station transaction within the last three years, though the system couple employ other predefined distance (i.e., 100 miles) and time (i.e., three years) constraints and/or set the distance and time constraints based on user input.

In some embodiments, upon determining a vehicle is within a predefined distance of the fuel pump and/or within a fuel station transaction geographic region, as discussed above, the system (e.g., via financial service provider system 140) may be configured to determine whether the vehicle requires fuel and to pre-authorize a fuel transaction up to a certain amount depending on that determination. That is, financial service provider system 140 (e.g., a credit card company) may associate a vehicle (e.g., using a vehicle identification number (VIN)) with a customer's credit card account. A lookup table or other database record may be utilized to determine the vehicle's fuel tank capacity. The system may thus be configured to determine and/or pre-authorize the credit card transaction for up to the amount that would allow the customer to fill his or her tank with fuel. This feature once again provides the added benefit of increased user efficiency in conducting fuel transactions.

In some embodiments, rather than the system pre-authorizing the credit card transaction, as discussed above, the system (e.g., via financial service provider system 140) may be configured to authorize the credit card transaction simultaneously with the customer initiating and/or conducting the fuel transaction.

In some embodiments, the system may set a single transaction limit sufficient to fill the fuel tank with fuel at an identified local fuel price based on one or more characteristics of the vehicle. To do this, the system may consider fuel tank size for the vehicle, assume that the tank is empty, and multiply the number of gallons that the fuel tank will hold by the identified local fuel price (which may be based on a vehicle-specific fuel type). The system may further utilize transaction data to detect and prevent attempted multiple transactions that are indicative of attempts to circumvent the system. The system, for example, may set a minimum time period that must elapse between fuel purchase transactions. The minimum time period may be calculated based on the amount of fuel purchased in the most recent transaction, the known miles-per-gallon of the vehicle associated with the credit card, and a maximum speed limit in the region (or nationally).

In some embodiments, the system may set a spend limit based on the single transaction limit. Optionally, the system may build in a buffer to the single transaction limit to ensure a user can always completely fill a fuel tank. The buffer, for example, may enable the user to still fill the vehicle's fuel tank in situations where the fuel price changes suddenly, or when a user selects a more expensive grade of fuel. To do this, the system may auto-generate a buffer based on whether the transaction is deemed too risky (e.g., if the system is monitoring a user's transactions as part of a fraud mitigation step). For example, the system may automatically include a 10% buffer such that the spend limit would allow the user to theoretically overfill the fuel tank by 10% based on the identified fuel price. If the transaction is deemed too risky (e.g., the system is monitoring the user's transactions as part of a fraud mitigation step), the system may drop the buffer to a lower number such as 2% or 0%. The system may also base the buffer level on user input.

In some embodiments, the system may determine whether a merchant location falls within the known fuel station transaction geographic region, as discussed above. The system may do this by determining a known region in which a user frequently purchases fuel based on past transaction history for the user and compare the merchant location to that known region. Merchant Category Codes (MCC), Merchant Name and/or Merchant ID, for example, may be utilized to identify the appropriate merchants and locations. In certain implementations, merchants identified as fuel stations (by the MCC) may be emphasized or prioritized in the determination of the fuel station transaction geographic region. In certain implementations, transactions in the user history that are indicated as "card-present" may be emphasized or prioritized in the determination of the fuel station transaction geographic region for the user. When the merchant location falls within the known fuel station transaction geographic region, the system may approve a transaction request up to the spend limit. Conversely, when the merchant location falls outside of the known fuel station transaction geographic region, the system may perform one or more fraud prevention actions to authenticate the user. Such fraud prevention actions may include certain types of multi-factor authentication communications/confirmations, for example, via the user's mobile computing device. The fraud prevention actions may include one or more of SMS message confirmation, e-mail confirmation, PIN entry, password entry, touchID, biometric confirmation, etc.

In some embodiments, responsive to authenticating a user within a predetermined time threshold, the system may approve a fuel transaction request up to the spend limit and may monitor a predetermined number of subsequent fuel transactions associated with the user's financial account(s) for fraud. In certain implementations, the predetermined number of monitored subsequent fuel transactions may be based on factors including but not limited to the amount of time between transactions, the spend amounts, the particular credit product, the user spend history, and/or similar user spend history. Conversely, responsive to not authenticating the user within the predetermined time threshold, the system may decline a fuel transaction request and/or may perform one or more fraud mitigation actions.

In decision block 306, the system (e.g., via vehicle communication system 110) may determine whether the first user device (e.g., user device 120) is associated with a first authorized user of the one or more authorized users. For example, the system may, upon detecting an established Bluetooth™ connection between the vehicle communication device and the mobile phone as discussed above with respect to block 304, identify whether the mobile phone is a device that was previously associated with the owner (or another authorized user of the vehicle). In some embodiments, the system may be configured to predict a driver of the vehicle by measuring a location of the mobile phone in physical space as compared to the location of the vehicle's Bluetooth™ transmitter. These features provide the added benefit of reducing potentially fraudulent transactions in that the system may not proceed with the retrieving and transmitting of payment account information, as discussed below, unless and until the system detects a user device associated with an authorized user of the vehicle. Further, the system may also optionally perform any of the above-mentioned features (e.g., location tracking, spend limits, pre-authorization, etc.) as additional security measures.

In some embodiments, the system may detect user devices associated with more than one authorized user. For example, a vehicle owner and her spouse may be riding in the vehicle together and may each be carrying a respective mobile phone. The system may thus be configured to detect both the owner's and the spouse's mobile phones. In such case, the system may be configured to predict which of the two authorized users is currently driving the vehicle, for example, based on one or more other vehicle user settings (e.g., chair position, mirror position, radio channel selections, etc.) stored in the vehicle's computer, and may as a default tee up the account payment information associated with the driver, as further described below. The system may also be configured to transmit a prompt, for example via the owner's and/or spouse's mobile phone (e.g., via a mobile application, a text message, an email, etc.) or a digital screen disposed within the vehicle, to allow the owner and/or spouse to manually select which of their respective account payment information they wish to use for the upcoming transaction, as further described below. The above-mentioned features may be customizable by one or more authorized users of the vehicle such that in an instance where the vehicle detects user devices associated with more than one authorized user, the system may be configured to tee up account payment information associated with a previously selected authorized user.

In some embodiments, the system may be configured with one or more additional customizable security features. For example, a user may opt to require that a user device (e.g., a mobile phone) be signed into one or more times between the system detecting an established Bluetooth™ connection and retrieving and/or transmitting payment account information, as discussed below. In another example, a user may opt to require payment via a mobile payment application (e.g., Apple Pay®, Samsung Pay®, etc.). That is, upon the fuel nozzle being inserted into the vehicle fuel tank, as discussed above, the user may be prompted via a mobile payment application to authorize payment (e.g., via biometric information, a passcode, etc.) for the fuel transaction.

In block 308, responsive to determining that the first user device is associated with the first authorized user, the system (e.g., via vehicle communication system 110) may unlock (e.g., via moveable shield 114 and/or electronic lock 116) the NFC tag to enable the NFC tag to communicate with the third-party POS NFC reader for a predefined time limit, as discussed above.

In block 310, the system (e.g., via vehicle communication system 110) may retrieve first account payment information (e.g., credit card information) associated with the first authorized user. In some embodiments, the first account payment information may have been previously stored within vehicle communication system 110. For example, one or more authorized users of the vehicle may have previously entered account payment information via a GUI of a mobile application associated with the vehicle, or a digital screen disposed within the vehicle. In some embodiments, upon determining that the first user device is associated with the first authorized user, as discussed above, vehicle communication system 110 may be configured to communicate in real-time with financial service provider system 140 (e.g., a credit card company) to request account payment information associated with an authorized user.

In block 312, the system (e.g., via vehicle communication system 110) may transmit, via the NFC tag, the first account payment information to the third-party POS NFC reader to complete the fuel transaction for the vehicle. That is, as discussed above, upon establishing a wireless connection between the NFC tag and the NFC reader—by way of inserting the fuel nozzle into the vehicle fuel tank—the system may transmit the first account payment information to the POS NFC reader to complete the transaction. In some embodiments, as discussed above, establishing the wireless connection may require the unlocking of the NFC tag.

FIG. 4 is a flow diagram of a method 400 for conducting contactless fuel payment. Method 400 may also be performed by one or more components of system 100. Method 400 is similar to method 300 of FIG. 3, except that method 400 does not require the unlocking of the NFC tag to enable the NFC tag to communicate with the third-party POS NFC reader. The descriptions of blocks 402, 404, 406, 408, and 410 are the same as or similar to the respective descriptions of blocks 302, 304, 306, 310, and 312 of method 300 and as such, are not repeated herein for brevity.

FIG. 5 is a flow diagram of a method 500 for conducting contactless fuel payment. Method 500 may also be performed by one or more components of system 100. Method 500 is similar to method 300 of FIG. 3, except that method 500 includes establishing a wireless connection between the NFC tag and POS NFC reader without requiring the unlocking of the NFC tag. The descriptions of blocks 502, 504, 506, 508, and 510 are the same as or similar to the respective descriptions of blocks 302, 304, 306, 310, and 312 of method 300 and as such, are not repeated herein for brevity.

Figure 6A:
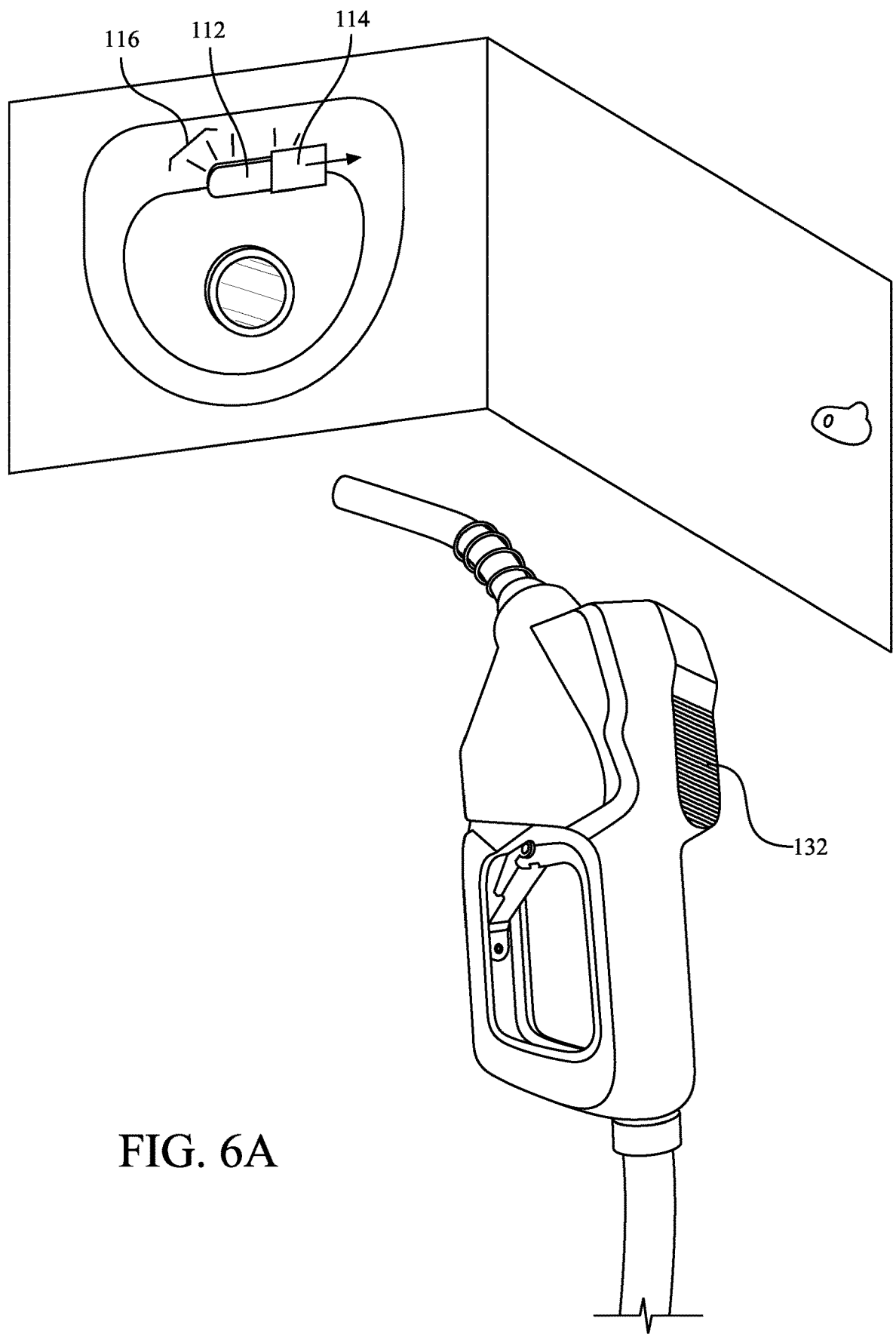
FIGS. 6A-6B are diagrams of an example fuel tank and fuel nozzle respectively comprising an NFC tag and third-party POS NFC reader, and establishing a wireless connection between the NFC tag and NFC reader.
Figure 6B:
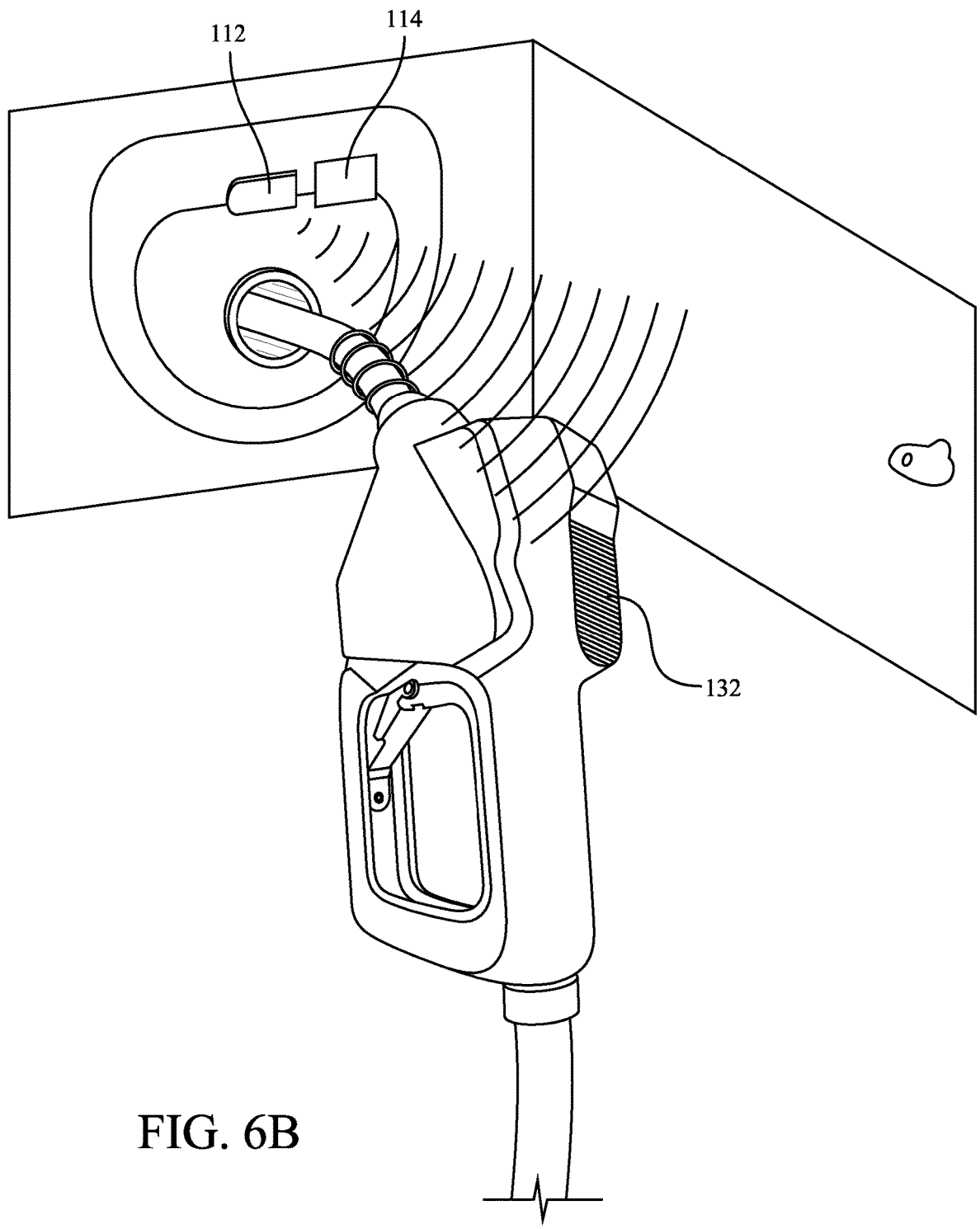

FIGS. 6A-6B provide an example of how a wireless connection may be established between an NFC tag disposed proximate a fuel tank and a third-party POS NFC reader disposed proximate a fuel nozzle. As shown, the fuel tank may comprise NFC tag 112 disposed along the top ("12 o'clock" position) of the fuel tank opening. The fuel tank may also comprise moveable shield 114 and/or electronic lock 116, as discussed above with respect to vehicle communication system 110. As shown in FIG. 6B, once NFC tag is free or uncovered from any of the above-mentioned features (i.e., moveable shield 114 is moved away and/or electronic lock 116 is turned off), a wireless connection may be established between NFC tag 112 and NFC reader 132 to conduct a fuel transaction.

Exemplary Use Cases

The following exemplary use cases describe examples of possible implementations of the disclosed technology. This section is intended solely for explanatory purposes, without limiting the scope of the disclosed technology.

In an example use case, a vehicle owner and his spouse may drive the vehicle to a fuel station to fill up the vehicle's fuel tank. The owner and his spouse may have previously set up customizable user features in the vehicle, such that the vehicle may recognize and connect with the individual's and spouse's respective mobile phones via a Bluetooth™ connection whenever the mobile phones have Bluetooth™ capability turned on, the vehicle is running, and the mobile phones are within a certain distance from the vehicle. In this example, the vehicle may thus detect both the individual's and spouse's respective mobile phones as both may be located inside the vehicle. When the owner and spouse drive up to the fuel station, they may park the vehicle next to a fuel pump and insert the fuel pump nozzle into the vehicle's fuel tank opening. An NFC reader disposed on the fuel nozzle may establish a wireless connection with an NFC tag disposed in a fixed position at the "12-o'clock" position along the perimeter of the vehicle's fuel tank opening. Upon the establishing of this wireless connection, the vehicle's internal computer may then receive a request to initiate a fuel transaction from the NFC reader and via the NFC tag. The vehicle's computer may then detect the individual's and spouse's mobile phones connected to the vehicle via Bluetooth™ and may determine that both mobile phones are those of authorized users based on the vehicle having previously received and stored the respective mobile phone and associated user information. A digital control display within the vehicle may include one or more user inputs such that the owner may receive a prompt to manually select whether to proceed with the fuel transaction via either the connection with the owner's phone or the spouse's phone. The owner may select his own phone for purposes of conducting this transaction. The vehicle's computer may then retrieve previously stored credit card information associated with the owner in response to the owner selecting his own associated mobile phone for use in the current transaction. Alternatively, without prompting the user to manually select with which authorized user device to proceed, the system may retrieve credit card information stored and associated with all connected authorized user devices (e.g., if both the owner's and spouse's devices are within range and/or the owner has multiple credit cards stored) and prompt the owner to select which credit card information to use. The vehicle's computer may transmit the owner's (or the selected) credit card information to the NFC tag such that the NFC tag may act as a credit card for conducting the transaction. The NFC tag may then transmit the credit card information, via the wireless connection, to the NFC reader such that the credit card information then gets transmitted from the fuel station POS terminal to a financial institution associated with the owner's credit card. The financial institution may then authorize the transaction.

In the above example, instead of using the vehicle's digital control display for selecting his own mobile phone for use in the transaction, the owner may instead receive a push notification to his mobile phone via an application associated with the vehicle. The push notification may include one or more user inputs displayed via a GUI to enable the owner to select whether he'd like to confirm or reject the use of his own mobile phone connection for purposes of conducting the fuel transaction.

In the above examples, prior to the establishing of the wireless connection between the NFC tag and the NFC reader, the owner or his spouse may be required to manually maneuver a moveable shield that is connected to the vehicle and physically covers a portion of the NFC tag. Once the moveable shield has been moved away from in front of the NFC tag, the wireless connection may be established and the NFC tag used for transmitting payment account information.

In the above examples, prior to the establishing of the wireless connection between the NFC tag and the NFC reader, the vehicle computer may be configured such that it must unlock a digital locking mechanism that blocks the NFC tag from establishing any wireless connection. Upon detecting the fuel nozzle has been inserted into the vehicle fuel tank, the vehicle computer may automatically unlock the digital locking mechanism such that the wireless connection may be established and the transaction request transmitted by the NFC reader through the NFC tag.

In some examples, disclosed systems or methods may involve one or more of the following clauses:

Clause 1: A contactless fuel payment system comprising: a near field communication (NFC) tag disposed at a fixed position proximate a fuel tank of a vehicle associated with one or more authorized users; a vehicle communication device associated with the vehicle and configured to selectively pair with one or more devices positioned within a predefined distance of the vehicle communication device to enable short-range wireless communication; one or more processors; and memory in communication with the one or more processors and storing instructions that, when executed by the one or more processors, are configured to cause the system to: receive, via the NFC tag, a transaction request for a fuel transaction for the vehicle from a third-party point-of-sale (POS) NFC reader positioned proximate a fuel pump; detect a first user device being paired with the vehicle communication device to enable the short-range wireless communication; determine that the first user device is associated with a first authorized user of the one or more authorized users; unlock the NFC tag to enable the NFC tag to communicate with the third-party POS NFC reader for a predefined time limit responsive to determining that the first user device is associated with the first authorized user, the NFC tag being configured to lock as a default before being unlocked and after the predefined time limit expires; and responsive to unlocking the NFC tag: retrieve first account payment information associated with the first authorized user; and transmit, via the NFC tag, the first account payment information to the third-party POS NFC reader to complete the fuel transaction for the vehicle.

Clause 2: The system of clause 1, wherein the NFC tag is configured to store the first account payment information.

Clause 3: The system of clause 1, wherein the instructions are further configured to cause the system to: detect a second user device being paired with the vehicle communication device to enable the short-range wireless communication; determine that the second user device is associated with a second authorized user of the one or more authorized users; unlock the NFC tag to enable the NFC tag to communicate with the third-party POS NFC reader for the predefined time limit responsive to determining that the second user device is associated with the second authorized user; and responsive to unlocking the NFC tag: retrieve second account payment information associated with the second authorized user; and transmit, via the NFC tag, the second account payment information to the third-party POS NFC reader to complete the fuel transaction for the vehicle.

Clause 4: The system of clause 1 further comprising: a moveable shield configured to cover at least a portion of the NFC tag such that the NFC tag is not viewable from outside the vehicle when the shield is in a first position, and the NFC tag is viewable from outside the vehicle when the shield is in a second position.

Clause 5: The system of clause 4, wherein unlocking the NFC tag comprises placing the shield in the second position.

Clause 6: The system of clause 4, wherein transmitting the first account payment information to the third-party POS NFC reader requires the shield to be in the second position.

Clause 7: The system of clause 1, wherein receiving the transaction request comprises establishing a wireless connection between the NFC tag and the third-party POS NFC reader.

Clause 8: The system of clause 7, wherein transmitting the first account payment information to the third-party POS NFC reader requires the establishing of the wireless connection.

Clause 9: The system of clause 1, wherein the third-party POS NFC reader is disposed proximate a fuel dispenser nozzle of the fuel pump.

Clause 10: A contactless fuel payment system comprising: a near field communication (NFC) tag disposed at a fixed position proximate a fuel tank of a vehicle associated with one or more authorized users; a vehicle communication device associated with the vehicle and configured to selectively communicate over a short-range wireless communication channel only with one or more devices positioned within a predefined distance of the vehicle communication device; one or more processors; and memory in communication with the one or more processors and storing instructions that, when executed by the one or more processors, are configured to cause the system to: receive, via the NFC tag, a transaction request for a fuel transaction for the vehicle from a third-party point-of-sale (POS) NFC reader positioned proximate a fuel pump; detect a first user device in communication with the vehicle communication device via the short-range wireless communication channel; determine that the first user device is associated with a first authorized user of the one or more authorized users; and responsive to determining the first user device is associated with the first authorized user of the one or more authorized users: retrieve first account payment information associated with the first authorized user; and transmit, via the NFC tag, the first account payment information to the third-party POS NFC reader to complete the fuel transaction for the vehicle.

Clause 11: The system of clause 10, wherein the instructions are further configured to cause the system to: responsive to determining the first user device is associated with the first authorized user of the one or more authorized users, unlock the NFC tag to enable the NFC tag to communicate with the third-party POS NFC reader for a predefined time limit, the NFC tag being configured to lock as a default before being unlocked and after the predefined time limit expires.

Clause 12: The system of clause 10, wherein the NFC tag is configured to store the first account payment information.

Clause 13: The system of clause 10, wherein the instructions are further configured to cause the system to: detect a second user device in communication with the vehicle communication device via the short-range wireless communication channel; determine that the second user device is associated with a second authorized user of the one or more authorized users; responsive to determining the second user device is associated with the second authorized user of the one or more authorized users: retrieve second account payment information associated with the second authorized user; and transmit, via the NFC tag, the second account payment information to the third-party POS NFC reader to complete the fuel transaction for the vehicle.

Clause 14: The system of clause 10, further comprising a moveable shield configured to cover at least a portion of the NFC tag such that the NFC tag is not viewable from outside the vehicle when the shield is in a first position, and the NFC tag is viewable from outside the vehicle when the shield is in a second position.

Clause 15: The system of clause 14, wherein transmitting the first account payment information to the third-party POS NFC reader requires the shield to be in the second position.

Clause 16: The system of clause 10, wherein receiving the transaction request comprises establishing a wireless connection between the NFC tag and the third-party POS NFC reader, the third-party POS NFC reader being disposed proximate a fuel dispenser nozzle of the fuel pump.

Clause 17: The system of clause 10, wherein the instructions are further configured to cause the system to: responsive to detecting the first user device in communication with the vehicle communication device via the short-range wireless communication channel, determine, via a location tracking system associated with the first user device, whether the first user device is within a predefined distance of the fuel pump; and retrieve the first account payment information associated with the first authorized user responsive to determining the first user device is within the predefined distance of the fuel pump.

Clause 18: A contactless fuel payment system comprising: a near field communication (NFC) tag disposed at a fixed position proximate a fuel tank of a vehicle associated with one or more authorized users; a vehicle communication device associated with the vehicle and configured to selectively communicate only with one or more devices positioned within a predefined distance of the vehicle communication device; one or more processors; and memory in communication with the one or more processors and storing instructions that, when executed by the one or more processors, are configured to cause the system to: establish a wireless connection between the NFC tag and a third-party point-of-sale (POS) NFC reader positioned proximate a fuel pump; detect a first user device in communication with the vehicle communication device; determine that the first user device is associated with a first authorized user of the one or more authorized users; and responsive to determining the first user device is associated with the first authorized user of the one or more authorized users: retrieve first account payment information associated with the first authorized user; and transmit, via the NFC tag, the first account payment information to the third-party POS NFC reader to complete a fuel transaction for the vehicle.

Clause 19: The system of clause 18, wherein the instructions are further configured to cause the system to: responsive to determining the first user device is associated with the first authorized user of the one or more authorized users, unlock the NFC tag to enable the NFC tag to communicate with the third-party POS NFC reader for a predefined time limit, the NFC tag being configured to lock as a default before being unlocked and after the predefined time limit expires.

Clause 20: The system of clause 18, wherein the third-party POS NFC reader is disposed proximate a fuel dispenser nozzle at the fuel pump.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A contactless fuel payment system comprising:
  a near field communication (NFC) tag disposed at a fixed position proximate a fuel tank of a vehicle associated with one or more authorized users;
  a vehicle communication device associated with the vehicle and configured to selectively pair with one or more devices positioned within a predefined distance of the vehicle communication device to enable short-range wireless communication;
  one or more processors; and
  memory in communication with the one or more processors and storing instructions that, when executed by the one or more processors, are configured to cause the system to:
    receive, via the NFC tag, a transaction request for a fuel transaction for the vehicle from a third-party point-of-sale (POS) NFC reader positioned proximate a fuel pump;
    detect a first user device being paired with the vehicle communication device to enable the short-range wireless communication;
    determine that the first user device is associated with a first authorized user of the one or more authorized users;
    automatically unlock the NFC tag to enable the NFC tag to communicate with the third-party POS NFC reader for a predefined time limit responsive to determining that the first user device is associated with the first authorized user based on detecting the first user device being paired with the vehicle communication device, the NFC tag being configured to automatically lock as a default before being unlocked and after the predefined time limit expires; and
    responsive to unlocking the NFC tag:
      retrieve first account payment information associated with the first authorized user; and
      transmit, via the NFC tag, the first account payment information to the third-party POS NFC reader to complete the fuel transaction for the vehicle.

2. The contactless fuel payment system of claim 1, wherein the NFC tag is configured to store the first account payment information.

3. The contactless fuel payment system of claim 1, wherein the instructions are further configured to cause the system to:
  detect a second user device being paired with the vehicle communication device to enable the short-range wireless communication;
  determine that the second user device is associated with a second authorized user of the one or more authorized users;
  unlock the NFC tag to enable the NFC tag to communicate with the third-party POS NFC reader for the predefined time limit responsive to determining that the second user device is associated with the second authorized user; and
  responsive to unlocking the NFC tag:
    retrieve second account payment information associated with the second authorized user; and
    transmit, via the NFC tag, the second account payment information to the third-party POS NFC reader to complete the fuel transaction for the vehicle.

4. The contactless fuel payment system of claim 1 further comprising: a moveable shield configured to cover at least a portion of the NFC tag such that the NFC tag is not viewable from outside the vehicle when the moveable shield is in a first position, and the NFC tag is viewable from outside the vehicle when the moveable shield is in a second position.

5. The contactless fuel payment system of claim 4, wherein unlocking the NFC tag comprises placing the moveable shield in the second position.

6. The contactless fuel payment system of claim 4, wherein transmitting the first account payment information to the third-party POS NFC reader requires the moveable shield to be in the second position.

7. The contactless fuel payment system of claim 1, wherein receiving the transaction request comprises establishing a wireless connection between the NFC tag and the third-party POS NFC reader.

8. The contactless fuel payment system of claim 7, wherein transmitting the first account payment information to the third-party POS NFC reader requires the establishing of the wireless connection.

9. The contactless fuel payment system of claim 1, wherein the third-party POS NFC reader is disposed proximate a fuel dispenser nozzle of the fuel pump.

10. The contactless fuel payment system of claim 1, wherein the system further comprises an electronic lock, and wherein automatically unlocking and locking the NFC tag is conducted via the electronic lock.

11. A contactless fuel payment system comprising:
a near field communication (NFC) tag disposed at a fixed position proximate a fuel tank of a vehicle associated with one or more authorized users;
a vehicle communication device associated with the vehicle and configured to selectively communicate over a short-range wireless communication channel only with one or more devices positioned within a predefined distance of the vehicle communication device;
one or more processors; and
memory in communication with the one or more processors and storing instructions that, when executed by the one or more processors, are configured to cause the system to:
receive, via the NFC tag, a transaction request for a fuel transaction for the vehicle from a third-party point-of-sale (POS) NFC reader positioned proximate a fuel pump;
detect a first user device in communication with the vehicle communication device via the short-range wireless communication channel;
determine that the first user device is associated with a first authorized user of the one or more authorized users; and
responsive to determining the first user device is associated with the first authorized user of the one or more authorized users based on detecting the first user device being in communication with the vehicle communication device via the short-range wireless communication channel:
automatically unlock the NFC tag;
retrieve first account payment information associated with the first authorized user; and
transmit, via the NFC tag, the first account payment information to the third-party POS NFC reader to complete the fuel transaction for the vehicle.

12. The contactless fuel payment system of claim 11, wherein the instructions are further configured to cause the system to:
responsive to determining the first user device is associated with the first authorized user of the one or more authorized users, unlock the NFC tag to enable the NFC tag to communicate with the third-party POS NFC reader for a predefined time limit, the NFC tag being configured to lock as a default before being unlocked and after the predefined time limit expires.

13. The contactless fuel payment system of claim 11, wherein the instructions are further configured to cause the system to:

detect a second user device in communication with the vehicle communication device via the short-range wireless communication channel;
determine that the second user device is associated with a second authorized user of the one or more authorized users;
responsive to determining the second user device is associated with the second authorized user of the one or more authorized users:
retrieve second account payment information associated with the second authorized user; and
transmit, via the NFC tag, the second account payment information to the third-party POS NFC reader to complete the fuel transaction for the vehicle.

14. The contactless fuel payment system of claim 11, further comprising a moveable shield configured to cover at least a portion of the NFC tag such that the NFC tag is not viewable from outside the vehicle when the moveable shield is in a first position, and the NFC tag is viewable from outside the vehicle when the moveable shield is in a second position.

15. The contactless fuel payment system of claim 14, wherein transmitting the first account payment information to the third-party POS NFC reader requires the moveable shield to be in the second position.

16. The contactless fuel payment system of claim 11, wherein receiving the transaction request comprises establishing a wireless connection between the NFC tag and the third-party POS NFC reader, the third-party POS NFC reader being disposed proximate a fuel dispenser nozzle of the fuel pump.

17. The contactless fuel payment system of claim 11, wherein the instructions are further configured to cause the system to:
responsive to detecting the first user device in communication with the vehicle communication device via the short-range wireless communication channel, determine, via a location tracking system associated with the first user device, whether the first user device is within a predefined distance of the fuel pump; and
retrieve the first account payment information associated with the first authorized user responsive to determining the first user device is within the predefined distance of the fuel pump.

18. A contactless fuel payment system comprising:
a near field communication (NFC) tag disposed at a fixed position proximate a fuel tank of a vehicle associated with one or more authorized users;
a vehicle communication device associated with the vehicle and configured to selectively communicate only with one or more devices positioned within a predefined distance of the vehicle communication device;
one or more processors; and
memory in communication with the one or more processors and storing instructions that, when executed by the one or more processors, are configured to cause the system to:
establish a wireless connection between the NFC tag and a third-party point-of-sale (POS) NFC reader positioned proximate a fuel pump;
detect a first user device in communication with the vehicle communication device;
determine that the first user device is associated with a first authorized user of the one or more authorized users; and responsive to determining the first user device is associated with the first authorized user of the one or more authorized users based on detecting that the first user device is in communication with the vehicle communication device:
automatically unlock the NFC tag;
retrieve first account payment information associated with the first authorized user; and
transmit, via the NFC tag, the first account payment information to the third-party POS NFC reader to complete a fuel transaction for the vehicle.

19. The contactless fuel payment system of claim 18, wherein the instructions are further configured to cause the system to:
responsive to determining the first user device is associated with the first authorized user of the one or more authorized users, unlock the NFC tag to enable the NFC tag to communicate with the third-party POS NFC reader for a predefined time limit, the NFC tag being configured to lock as a default before being unlocked and after the predefined time limit expires.

20. The contactless fuel payment system of claim 18, wherein the third-party POS NFC reader is disposed proximate a fuel dispenser nozzle at the fuel pump.

* * * * *